March 11, 1958     W. F. KLUGE     2,826,305

OSCILLATING DEVICE AND RUBBER BUFFER THEREFOR

Filed May 31, 1952

Inventor:
Wilhelm F. Kluge
By Walter Becker
Patent Agent

2,826,305

OSCILLATING DEVICE AND RUBBER BUFFER THEREFOR

Wilhelm F. Kluge, Essen, Germany, assignor to Aktiengesellschaft für Unternehmungen der Eisen- und Stahlindustrie, Essen, Germany Application May 31, 1952, Serial No. 290,897

Claims priority, application Germany June 8, 1951

2 Claims. (Cl. 209—365)

The present invention relates to oscillating devices, especially to a swing sieve or shaking screen with two counter oscillating masses having rubber buffers arranged therebetween.

More particularly, the invention relates to such oscillating devices of the type set forth in the preceding paragraph in which, in the oscillating direction at both sides of the members connected to one of the oscillating masses, there are provided energy storing rubber buffers in such a manner that, within the range around the intermediate position of one of the oscillating masses, the said buffers will remain non-loaded and will store and again release the oscillating energy only in the range of the reversing positions. The range around the intermediate position of the oscillating mass may be varied.

With oscillating devices of this type, it is frequently desired to produce different effects of the rubber buffers. Thus, for instance, with swing sieves or shaking screens, it is frequently necessary continuously to lift out of the openings in the sieve or the interstices of the screen those parts of the material, which enter or stick into the interstices, in order to maintain the said interstices free for the succeeding material. With draining sieves, it is desired over a short as possible length of the sieve to effect as extensive a drainage as possible.

It is, therefore, an object of this invention, to improve the oscillating devices above referred to so as to be able with simple means to meet the requirements set forth in the preceding paragraph.

As is well known, the usually hemispherically shaped impact surface of rubber buffers is subject to a great wear or abrasion. This wear is particularly great with buffers between which the oscillating part is thrown back and forth so that the consumption of rubber buffers is very considerable.

It is therefore a further object of this invention to limit the wear of the buffers to a minimum and thus to increase their life.

Rubber buffers are known having a buffer head and a buffer base, of soft rubber, while a metal disc is provided between said buffer base and said buffer head. This measure, however, is not suitable for avoiding wear or abrasion which is the greater the more the rubber mass at the impact surface of the buffer slides on the impact surface, for instance, of the transverse member of the oscillating part, in a direction transverse to the oscillating direction. The base surface of the rubber head is prevented by the metal disc from dislocating transverse to the pushing direction. However, since the metal disc due to its rigidity will allow a displacement of the rubber mass of the rubber head into the range of the rubber base, to a negligible extent only, the rubber mass of the buffer head will primarily move in radial direction so that also with these buffers a strong abrasion will occur. This abrasion or wear will be further increased due to the fact that also the rubber head consists of soft rubber.

During the operation of an oscillating device of this type, the oscillating mass will be bounced back and forth between the rubber buffers. In order to obtain a soft landing of the butting parts of the oscillating mass, the butting surfaces of the rubber buffers are advantageously shaped hemispherically. Due to the compression of the rubber buffer, the layer at the butting surface thereof will be pressed or displaced toward the outside and, as a result thereof, a sliding will be effected between the said layer and the butting part of the oscillating mass. This sliding causes a strong abrasion or wear at the butting surface and thus produces an increased wear of the buffer. On the other hand, due to the great damping or cushioning effect, it is not possible to make the entire rubber buffer of abrasion resistant material.

It is, therefore, another object of this invention to provide buffer means which, while employing rubber, will overcome the just mentioned drawbacks.

These and other objects and advantages of the invention will appear more clearly from the following specification in connection with the accompanying drawings, in which.

General arrangement

In order to produce different effects with the rubber buffers used in connection with oscillating devices of the above mentioned type, there are, according to the present invention, rubber buffers used which have a different spring rate or coefficient of elasticity. Depending on whether in the upper or lower reversing position of the oscillating device it is desired to produce a harder abutment than in the other reversing position, the upper or lower buffer will have a greater spring rate or elastic characteristic.

As has been mentioned above, the wear will be the greater, the more the rubber mass at the impact surface of the buffer slides in a direction transverse to the oscillating direction on the impact surface of the oscillating member hit thereby. This movement of the rubber mass, which may be compared to an erasing action is, according to the present invention, avoided by holding the rubber mass adjacent the buffer impact surface by an insert extending transverse to the oscillating direction and made of pull resistant but flexible textile material. As a further measure to prevent the wear or abrasion, the impact surface of the buffer is made of particularly resistant and thus wear resistant rubber, whereas the remainder of the buffer is made of soft rubber. In order, for reasons connected with the oscillating technique, to be able to use highly elastic slightly damping material, while simultaneously overcoming the drawback of a great abrasion, there is suggested according to the present invention to form the butting surface of the buffer consisting of slightly damping material by a layer of abrasion resistant material. This layer may be directly vulcanized to the slightly damping material.

Structural arrangement

Figure 1:
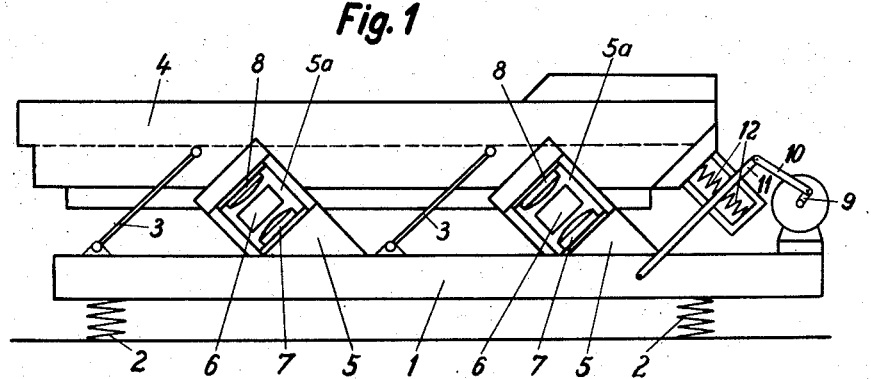
Figure 1 represents a side view of a swing sieve to which the present invention may be applied.

Referring now to the drawings in detail and Fig. 1 thereof in particular, the structure shown therein comprises a supporting frame 1 which is yieldingly supported by springs 2 with regard to a stationary base. Supported by the frame 1 by means of normally inclined pivot rods or leaf springs 3 is a sifter box 4. At each side of the supporting frame 1 there are arranged two supporting members 5 with window-like openings 5a which supporting members extend in the direction of oscillation of the sifter box 4, i. e., substantially perpendicular to the rods 3. Rigidly connected to the sifter box 4 at each longitudinal side thereof are two transverse pieces 6 which extend into the window-like openings 5a of the supporting members 5. As will be seen from the drawing, rubber buffers 7 and 8 are mounted on the supporting members 5 at both sides of the transverse pieces, when looking in the direction of oscillation.

A crank drive 9 actuates the rocking arm 11 by means of the connecting rod 10. The rocking arm 11 is located between coupling springs 12 which, in a manner known per se, bring about the counter oscillations of the two masses 1 and 4.

If, for instance, material is processed which sticks into the interstices of the screen or sieve, the spring rate or coefficient of elasticity of the buffer 8 is selected greater than that of the buffer 7. As a result thereof, the swing sieve will instantly be braked in its upper reversing position so that the material on the screen will be subjected to a strong shock which will also loosen those parts of the material which were stuck in the said interstices. Inasmuch as the abutment at the buffer 7 will be materially softer than that at the buffers 8, the wedging of parts of the material in the interstices of the screen or holes in the sieve will be prevented. When effecting a drainage on the sieve, the spring rate or coefficient of elasticity of the buffer 7 is selected greater than that of the buffer 8 so that the abutment at the buffer 7 is particularly hard, which fact will materially favor the separation of liquid.

Figure 2:
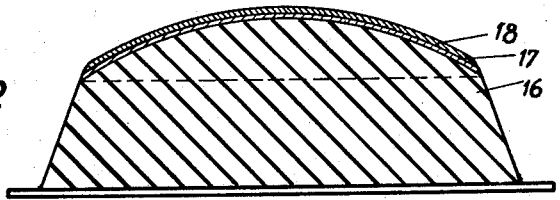
Figure 2 illustrates in section an embodiment of a buffer according to the invention.
Figure 3:
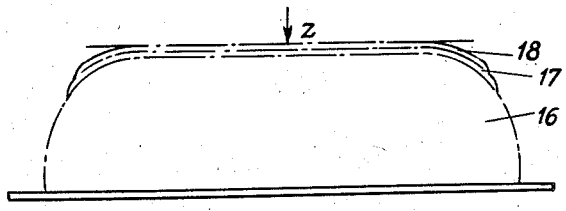
Figure 3 shows the buffer of Figure 2 in compressed condition.

According to the embodiment shown in Figures 2 and 3, a pull resistant flexible webbing material 17 is provided on the crest 16 which latter consists of soft rubber. The said flexible webbing material 17 is covered by a thin layer 18 of resistant and abrasion resistant rubber. When the buffer is subjected to pressure in the direction of the arrow z, a radial displacement at the impact surface of the buffer cannot take place. Also in this instance, the displacement of the rubber mass brings about a bulging of the buffer at the circumference thereof.

It is, of course, understood that the present invention is, by no means, limited to the particular constructions shown in the drawings but also comprises any modifications within the scope of the appended claims.

What I claim is:

1. In an oscillating device, particularly oscillating screen, the combination of: a first oscillatory member, yielding means yieldably supporting said first oscillatory member, a second oscillatory member swingably connected to said first oscillatory member, oscillating power means arranged to cause said second oscillatory member to perform a certain desired and substantially the same oscillating stroke throughout the desired oscillation of said oscillating device, supporting means connected to said first oscillating member, spaced rubber buffer means facing each other and carried by said supporting means, the rubber buffer means facing each other being spaced from each other by a distance less than said certain oscillating stroke of said second oscillating member, and contact means connected to said second oscillatory member and extending between said rubber buffer means but spaced therefrom when said second oscillatory member is in its central position so that said buffer means will remain unloaded during the movement of said contact means relative to the adjacent buffer means over a certain central oscillating range, the rubber buffer means at one side of said contact means having a higher coefficient of elasticity than the rubber buffer means at the other side of said contact means to thereby bring about at one reversing position of said contact means a harder abutment than at the other reversing position.

2. In combination in an oscillating device, particularly oscillating screen, which has oscillating contact means connected to one of two counter-oscillating masses, first energy storing and releasing rubber buffer means arranged in the oscillating direction of said oscillating contact means at one side thereof and adapted to engage said oscillating contact means for limiting the movement thereof in one direction, and second energy storing and releasing rubber buffer means facing said first rubber means and arranged in the oscillating direction of said oscillating contact means at the other side thereof for limiting the movement of said oscillating contact means in the other direction, each of said rubber buffer means including a buffer body of soft rubber with a spherical surface and pull-resistant flexible webbing material mounted on and connected to the respective buffer body, while a thin layer of resisting and wear-resistant rubber covers said webbing material and is connected thereto, the rubber buffer means at one side of said oscillating contact means having a higher coefficient of elastictiy than the rubber buffer means at the other side of said oscillating contact means to thereby bring about at one reversing position of said oscillating contact means a harder abutment than at the other reversing position, said first and said second rubber buffer means being spaced from said oscillating contact means by a certain distance when said oscillating contact means is in its medium position so that said first and second buffer means will remain unloaded during the movement of said oscillating contact means relative to said first and second buffer means over a certain central oscillating range of said oscillating contact means.

References Cited in the file of this patent

UNITED STATES PATENTS

| | | |
|---|---|---|
| 422,043 | Stone | Feb. 25, 1890 |
| 1,728,657 | Binte | Sept. 17, 1929 |
| 1,915,249 | Jorgensen | June 20, 1933 |
| 1,997,499 | Schieferstein et al. | Apr. 9, 1935 |
| 2,024,101 | Kahn | Dec. 10, 1935 |
| 2,299,661 | Symons | Oct. 20, 1942 |
| 2,356,246 | Jones | Aug. 22, 1944 |
| 2,596,780 | Meyers et al. | May 13, 1952 |

FOREIGN PATENTS

| | | |
|---|---|---|
| 135,546 | Great Britain | Oct. 22, 1908 |
| 505,783 | Belgium | Sept. 29, 1951 |
| 650,638 | Germany | Sept. 27, 1937 |
| 677,571 | Germany | June 28, 1939 |
| 806,357 | France | Sept. 21, 1937 |
| 891,249 | France | Nov. 29, 1943 |